Patented June 4, 1946

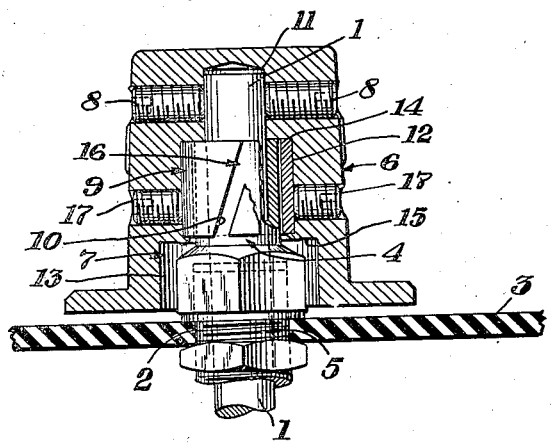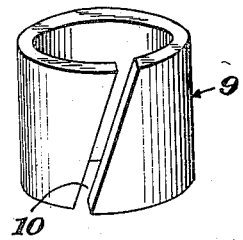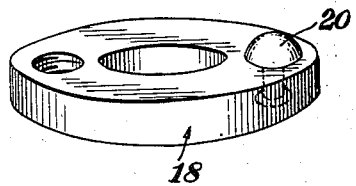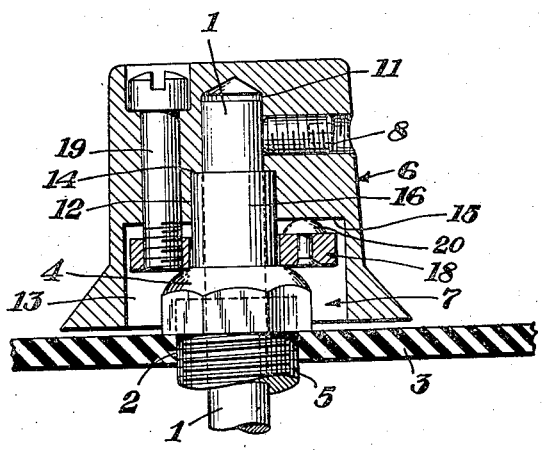

2,401,351

UNITED STATES PATENT OFFICE 2,401,351

LOCKING DEVICE

John A. Herbst, Oradell, N. J., and Marc J. Hassid, New York, N. Y., assignors to Federal Telephone and Radio Corporation, New York, N. Y., a corporation of Delaware Application November 18, 1944, Serial No. 564,088

6 Claims. (Cl. 74—531)

This invention relates in general to locking devices for shafts and more particularly to a manually controlled locking device which will prevent the shaft of radio and other instruments from being rotated by forces jarring the instrument or by inadvertent engagement of a control knob, dial or other part associated therewith.

It is of importance in many radio and other instruments, that after a particular adjustment is made, it remains in such adjustment even though the instrument be subjected to rough and varied movements. It is also of importance that the means for locking the control be so disposed as to minimize accidental engagement thereof by operators or others.

One of the objects of this invention is to provide a shaft locking device which will assure permanence to a selected adjustment of the control knob or dial associated therewith.

Another object of this invention is to provide a shaft locking device capable of being concealed within a knob attached to the shaft.

According to one feature of our invention, we prefer to lock the knob, and thereby lock the shaft connected to the knob, to a fixed bearing member in which the shaft is journaled. To accomplish the locking, we prefer to use an intermediary member between the knob and bearing member, preferably a resilient annular member like a split cylindrical sleeve, to frictionally engage the shaft bearing member. This resilient split sleeve, carried in a recess in the knob, is preferably urged into frictional engagement with the bearing member by means carried by the knob. For this purpose, we prefer to use a threaded member threadably engaged in the knob and adapted to force the resilient split sleeve member into frictional engagement with the fixed bearing member, thereby locking the shaft.

According to a further feature of this invention, we again use an intermediary member between the knob and the bearing member. This time, the member is shaped like an annular disc and arranged for pivoted movement into frictional engagement with the fixed bearing member by means carried by the knob. For this purpose, we prefer to use a threaded member rotatably arranged in the knob and threadably engaged in the disc. Pivotal means are provided for the disc so that when the disc is acted upon by the threaded member, the disc is pivoted into frictional engagement with the fixed bearing member thereby locking the shaft.

Further objects and features of this invention will become apparent upon considering the following description when taken in connection with the accompanying drawing, in which:

Fig. 1 is a vertical cross-sectional view of one embodiment of this invention;

Fig. 2 is a perspective view of the locking member incorporated in the locking device shown in Fig. 1;

Fig. 3 is a vertical cross-sectional view of another embodiment of this invention; and Fig. 4 is a perspective view of the locking member incorporated in the locking device shown in Fig. 3.

Referring now to the embodiment illustrated in Figs. 1 and 2, the locking device there shown is applied to the end of a shaft 1, where the selective rotation of the shaft can be controlled, and where the locking of the shaft is readily accessible to the operator. The shaft 1 extends through an opening 2 in a frame or like member 3 where it journaled in a bearing member 4 fixed to the frame member 3, by an externally threaded member 5 threadably engaged in the bearing member. The bearing member 4, if desired, may be a unitary part of the frame member 3.

To selectively control the rotation of the shaft 1, a knob 6, is secured to the shaft for rotation therewith. Preferably the knob 6 is provided with a longitudinal recess 7, adjacent one end thereof, into which the shaft is received. For the purpose of fastening the knob to the shaft, the knob is provided with threaded members 8, threadably engaged in the knob, and rotatably moved into frictional engagement with the shaft, thereby securely fastening the knob and shaft together.

To accomplish the locking the shaft in any selected position, an intermediary member 9 is positioned in the knob 6 between the knob and the journal bearing member 4. This intermediary member 9 is preferably formed as a resilient cylindrical sleeve, split throughout its longitudinal length as shown at 10, to permit the diminution of its diameter when forceably acted upon to frictionally engage the outer surface of the journal bearing 4.

To prevent endwise movement and retain the resilient, split sleeve 9 in the recess 7, the recess is preferably formed as a series of wells 11, 12 and 13, of different diameters each a predetermined distance from one end of the knob. This provides the recess with inwardly extending circumferential shoulders 14 and 15. The split sleeve 9 having an outer diameter normally slightly greater than the internal diameter of the intermediate well 12 is forceably inserted into the well where it is held frictionally engaged against the wall defining the well 12. To longitudinally locate the split sleeve 9 in the well 12, one end of the sleeve is held adjacent the shoulder 14 by peening a portion of the shoulder 15 over the other end.

To facilitate the proper frictional engagement of the intermediary sleeve member 9 with the journal bearing member 4, the outer surface 16 of the bearing member 4 is made cylindrical. This cylindrical portion is formed with a diameter slightly less than the normal internal diameter of the sleeve to provide clearance therebetween.

To forceably move the sleeve member 9 into frictional engagement with bearing member 4 and lock the shaft 1 from rotation, the knob 6 is provided with radially disposed threaded members 17. These threaded members threadably engaged in the knob 6 are adapted, upon rotation to frictionally engage the outer circumference of the sleeve 9. Continued rotation of the threaded members 17 will gradually reduce or diminish the diameter of the sleeve 9, as permitted by the longitudinal split 10, until the inner surface of the sleeve frictionally engages the outer cylindrical portion 16 of the bearing member 4.

From the foregoing detailed description of the locking device shown in Figs. 1 and 2, it can readily be seen that rotation of the threaded members 17, frictionally locks the shaft 1 against further rotation. That is, the inward rotation of the threaded members 17 frictionally bear against the outer surface of split sleeve member 9 to lock the sleeve from rotation in the knob and also frictionally lock the inner surface of the split sleeve 9 about the outer surface of the journal bearing 4.

Referring now to the embodiment illustrated in Figs. 3 and 4, the locking device there shown is also applied to the end of a shaft where the selective rotation of the shaft can be controlled and where the locking of the shaft is readily accessible to the operator.

Those parts in Fig. 3 that correspond to certain parts in Fig. 1 are given the corresponding reference characters.

The control of the shaft 1 in Fig. 3 is similar to that shown in Fig. 1, in that a knob 6 is fastened to the end of the shaft 1 for selective rotation therewith. The knob 6 receives the shaft 1 in a recess 7 and is fastened thereto by a threaded member 8.

To accomplish the locking of the shaft in any selected position, an intermediary member 18 is disposed in recess 7 adjacent the journal bearing member 4. The member 18 is an annular disc capable of being moved into frictional engagement with the journal bearing member 4 by a threaded member 19 moveably carried in the knob 6. The central opening of member 18 is of a diameter slightly greater than the outer diameter of the journal bearing 4 which it encircles.

The threaded member 19 is rotatably arranged in the knob and threadably engaged in the disc 18 so as to support the disc as desired. To facilitate a locking motion of the disc 18, the disc is provided with pivotal means 20 in operative relation between one surface of the annular disc and the shoulder 15. To pivotally move the annular disc 18 into clamping engagement with the journal bearing member 4, the member 19 is turned thereby forcing the disc to pivot about the point where a round-headed rivet engages the shoulder 15.

While only one form of pivotal means has been shown, others for example, a raised portion on either the disc or the shoulder or both may be provided. A tapered or distorted disc may be employed, or a tapered ring may be inserted into the well between the disc and the shoulder. A hardened ball may be used with equal efficiency by placing a portion of the ball in a socket provided in the face of the disc with its protruding portion bearing against the surface of the shoulder.

From the foregoing detailed description of the locking device illustrated in Figs. 3 and 4, it can readily be seen that the rotation of the threaded member 19 will gradually force the annular disc 18 about the pivot member 20 and out of coaxial alignment with the outer surface of the journal bearing. As the disc is moved about its pivot, the wall of the opening in the disc will clamp against the outer surface of the journal bearing and thereby lock the shaft against rotation.

While we have shown and described one embodiment of this invention together with a modification thereof it is to be clearly understood that such illustrations are made only by way of example and not as a limitation of the scope of the invention as set forth in the objects and accompanying claims.

We claim:

1. A device for locking a rotatable shaft and its bearing against any relative movement comprising a knob having a recess therein, means for securing said knob to said shaft, a bearing member extending into said recess for journaling said shaft, an annular member disposed in said recess about said bearing member, and an adjustable element carried by said knob for effecting a locking relation between said annular member, said knob and said bearing member.

2. A device according to claim 1 wherein said bearing member comprises a body having an internal longitudinal bore throughout a substantial portion of its length for rotatably journaling said shaft and a portion of its outer surface cylindrically shaped for engagement with said annular member.

3. A device according to claim 1, wherein said annular member comprises a resilient split sleeve having an external diameter greater than the internal diameter of the part of said recess into which it is forceably inserted and therein held yieldingly, and an internal diameter greater than the adjacent external diameter of said bearing member, said adjustable element being adapted to forceably urge said split sleeve toward said bearing member whereby the internal diameter of said sleeve is diminished for frictional engagement with said bearing member.

4. A device for locking a rotatable shaft and its bearing against any relative movement comprising a knob having a recess therein formed by a plurality of coaxial wells of different diameters forming shoulders, each a predetermined distance from one end thereof; means carried by said knob for securing said shaft in one of said wells, a bearing element extending into said recess, an annular member carried by said knob in another of said wells, said annular member held in spaced apart relation from one of said shoulders, and means for urging said annular member into frictional engagement with said bearing element.

5. A device according to claim 4, wherein said annular member comprises an annular disc having an internal diameter greater than the adjacent portion of said bearing member and a raised portion adjacent said one of said shoulders for pivotal contact therewith.

6. A device for locking a rotatable shaft and its bearing against any relative movement comprising a knob having a recess therein formed by a plurality of wells of different diameters, each a predetermined distance from one end thereof; a pair of inwardly extending shoulders formed by the junction of said wells, means for securing said knob to said shaft, a bearing member extending into said recess, said bearing member being provided with a longitudinal bore throughout a substantial portion of its length for rotatably journaling said shaft and having a portion of its outer surface cylindrically shaped, an annular disc having an internal diameter greater than the external diameter of the cylindrical portion of said bearing member, said disc being disposed in another of said wells substantially coaxial to said bearing member and provided with a laterally extended portion adjacent one of said shoulders for pivotal contact therewith, an adjustable element carried by said knob adapted to engage said annular disc at a point substantially radially opposite said extended portion, said annular disc being urged out of coaxial alignment and into frictional engagement with said cylindrical portion of said bearing member upon adjustment of said element relative to said knob.

JOHN A. HERBST.
MARC J. HASSID.